(12) United States Patent
Deopura et al.

(10) Patent No.: US 7,962,588 B1
(45) Date of Patent: Jun. 14, 2011

(54) METHOD AND SYSTEM FOR MANAGING OPTICAL NETWORK ELEMENTS

(75) Inventors: Koustubh Deopura, Glen Burnie, MD (US); David Albert, Bethesda, MD (US)

(73) Assignee: Ciena Corporation, Linthicum, MD (US)

( * ) Notice: Subject to any disclaimer, the term of this patent is extended or adjusted under 35 U.S.C. 154(b) by 957 days.

(21) Appl. No.: 10/062,163

(22) Filed: Feb. 1, 2002

(51) Int. Cl.
*G06F 15/173* (2006.01)

(52) U.S. Cl. ........ 709/223; 709/220; 709/221; 709/224; 709/226; 717/168; 717/170; 717/171; 717/172; 717/173; 717/174; 717/175; 717/176; 717/177; 717/178

(58) Field of Classification Search .................. 709/223, 709/224, 250, 226, 220, 221; 715/733–739; 717/168, 170, 171, 172, 173, 174, 175, 176, 717/177, 178
See application file for complete search history.

(56) References Cited

U.S. PATENT DOCUMENTS

| | | | | |
|---|---|---|---|---|
| 5,999,179 A * | 12/1999 | Kekic et al. | .................... | 715/734 |
| 6,108,309 A * | 8/2000 | Cohoe et al. | .................. | 370/241 |
| 6,128,016 A * | 10/2000 | Coelho et al. | ................. | 715/808 |
| 6,151,023 A * | 11/2000 | Chari | ............................. | 715/854 |
| 6,584,499 B1 * | 6/2003 | Jantz et al. | ..................... | 709/220 |
| 6,615,405 B1 * | 9/2003 | Goldman et al. | ............. | 717/174 |
| 6,639,910 B1 * | 10/2003 | Provencher et al. | .......... | 370/351 |
| 6,650,347 B1 * | 11/2003 | Nulu et al. | ..................... | 715/853 |
| 6,664,978 B1 * | 12/2003 | Kekic et al. | .................... | 715/733 |
| 6,664,988 B1 * | 12/2003 | Rollins | ......................... | 715/853 |
| 6,694,450 B1 * | 2/2004 | Kidder et al. | ................... | 714/15 |
| 6,701,356 B1 * | 3/2004 | Condict et al. | ................ | 709/220 |
| 6,708,291 B1 * | 3/2004 | Kidder | ............................ | 714/39 |
| 6,715,097 B1 * | 3/2004 | Kidder et al. | ...................... | 714/2 |
| 6,742,134 B1 * | 5/2004 | Pothier et al. | ...................... | 714/4 |
| 6,934,749 B1 * | 8/2005 | Black et al. | ................... | 709/224 |
| 6,983,362 B1 * | 1/2006 | Kidder et al. | ...................... | 713/1 |
| 7,017,121 B1 * | 3/2006 | Gikas et al. | ................... | 715/804 |
| 7,020,696 B1 * | 3/2006 | Perry et al. | ..................... | 709/223 |
| 7,039,046 B1 * | 5/2006 | Simons et al. | ................. | 370/388 |
| 7,051,097 B1 * | 5/2006 | Pecina | ........................ | 709/224 |
| 7,062,642 B1 * | 6/2006 | Langrind et al. | ................. | 713/1 |
| 7,111,053 B1 * | 9/2006 | Black et al. | ................... | 709/220 |
| 7,130,870 B1 * | 10/2006 | Pecina et al. | .......................... | 1/1 |
| 7,197,545 B1 * | 3/2007 | Davie | ............................ | 709/220 |
| 7,225,240 B1 * | 5/2007 | Fox et al. | ....................... | 709/223 |
| 7,363,359 B1 * | 4/2008 | Tripathy et al. | ............... | 709/223 |
| 2002/0059467 A1 * | 5/2002 | Rapp et al. | ..................... | 709/250 |
| 2002/0069275 A1 * | 6/2002 | Tindal | ........................... | 709/223 |
| 2002/0174207 A1 * | 11/2002 | Battou | .......................... | 709/223 |
| 2004/0031030 A1 * | 2/2004 | Kidder et al. | ................. | 717/172 |

* cited by examiner

*Primary Examiner* — Dohm Chankong

(74) *Attorney, Agent, or Firm* — Clements Bernard PLLC; Christopher L. Bernard; Jeffrey M. Measures

(57) ABSTRACT

An optical communications network including a plurality of optical network elements and a plurality of network management systems. Each of network management systems executes a framework application. A communications link couples at least one of the network management systems and at least one of the optical network elements. A memory device is accessible by the network management system. The network management system communicates with the optical network element to detect a hardware feature present at the optical network element. The network management system determines a feature application supporting the hardware feature that is not supported by the framework application. The network management system loads the feature application from the memory device to the framework application and executes the feature application to manage the optical network element.

16 Claims, 9 Drawing Sheets

METHOD AND SYSTEM FOR MANAGING OPTICAL NETWORK ELEMENTS

BACKGROUND OF THE INVENTION

1. Field of Invention

The invention relates to a method and system for managing optical network elements in an optical communications network.

2. Description of Related Art

Optical communications networks utilize a variety of optical network elements to transmit information from sender to receiver. The optical network elements may be geographically distributed over a wide area and existing systems utilize network management systems to communicate with the optical network elements. Network management systems interface with the optical network elements and obtain information (e.g., operational status) from the optical network elements. This information is then presented (e.g., through a graphical user interface or GUI) to entities such as service providers using the network or technicians servicing the network.

In conventional systems, network management systems use monolithic software applications. When hardware is altered in the optical network elements (e.g., hardware upgraded to add a new feature) the existing network management software in the network management system also needs to be updated to interface with the new hardware. This practice of entirely replacing the network management software has several drawbacks.

One drawback is the difficulty in updating the network management software in multiple, geographically dispersed network management systems. A technician may need to physically access each network management system and install new network management software to support the new hardware feature. As the release of improved hardware becomes more and more frequent, upgrading the monolithic network management software on multiple, geographically dispersed network management systems becomes a daunting task.

A further drawback is customer acceptance of the new, monolithic network management software. Customers often require substantial testing before accepting the installation of new, monolithic network management software. Customers may, however, relax this requirement for software updates that do not replace the monolithic network management software. Such testing can be a prolonged process, resulting in significant participation by the software supplier thereby increasing costs associated with the software update and delaying time to market.

SUMMARY OF THE INVENTION

An exemplary embodiment of the invention is an optical communications network including a plurality of optical network elements and a plurality of network management systems. Each of network management systems executes a framework application. A communications link couples at least one of the network management systems and at least one of the optical network elements. A memory device is accessible by the network management system. The network management system communicates with the optical network element to detect a hardware feature present at the optical network element. The network management system determines a feature application supporting the hardware feature that is not supported by the framework application. The network management system loads the feature application from the memory device to the framework application and executes the feature application to manage the optical network element.

Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Embodiments of the present invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of embodiments of the invention refers to the accompanying drawings. The same reference numbers in different drawings identify the same or similar elements. Also, the following detailed description does not limit the invention. Instead, the scope of the invention is defined by the appended claims and equivalents thereof.

Figure 1:
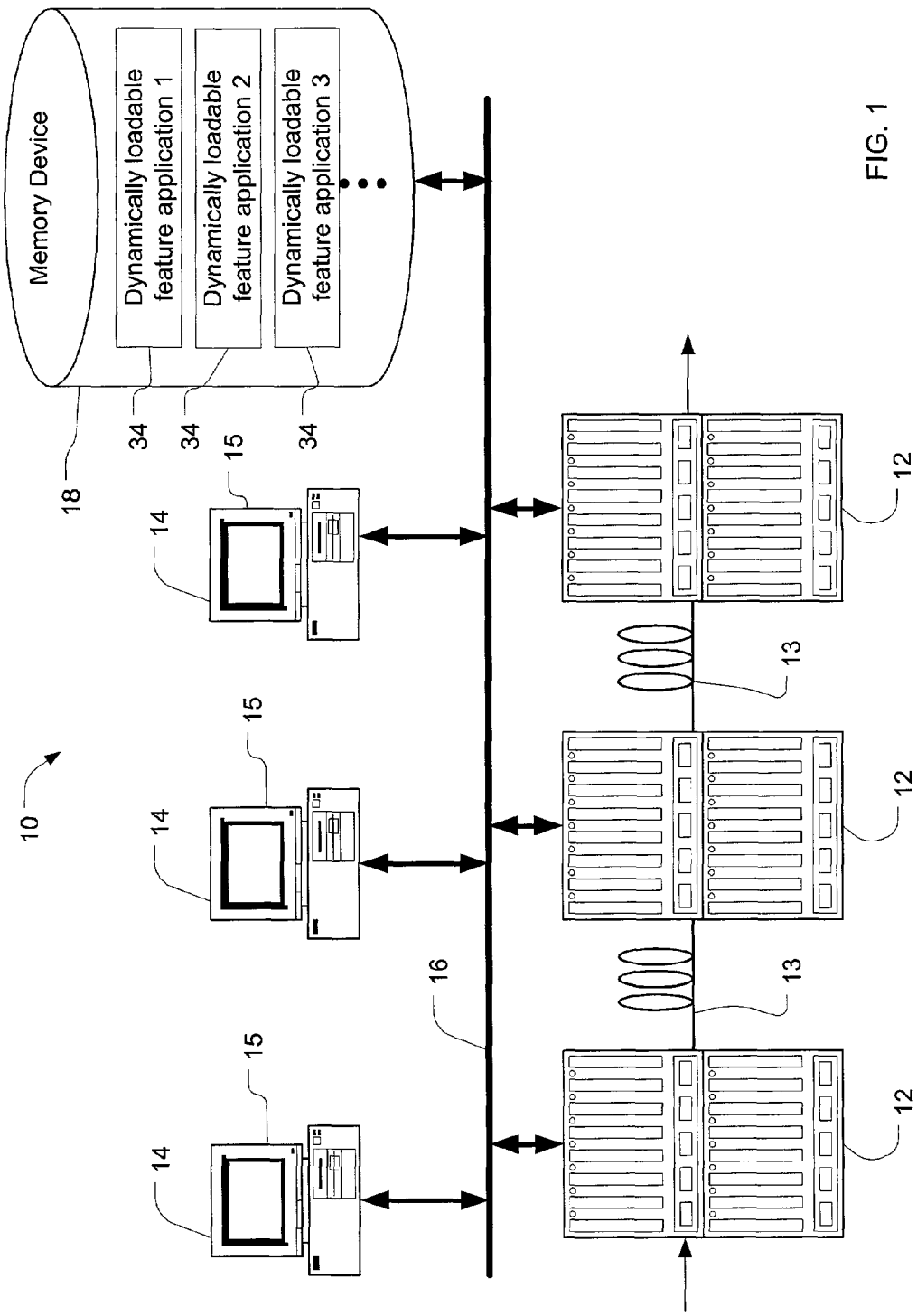
FIG. 1 is a block diagram of an exemplary optical communications network.

FIG. 1 is a block diagram of an exemplary optical communications network 10 in which embodiments of the invention may be utilized. The optical communications network 10 includes a number of optical network elements 12 that transmit information from a sender to a receiver over a transmission medium, such as optical fiber 13. The optical network elements 12 may be devices such as routers, switches, amplifiers, add-drop multiplexers or terminals and may transmit information using a variety of technologies (e.g., wavelength division multiplexing or WDM).

The optical network elements 12 interface with one or more network management systems 14. The network management systems 14 may be implemented using general-purpose computers executing computer programs to provide the processing described herein. A network management system 14 may be implemented by a portable computer used by a technician for diagnosis and/or service of optical communications network 10. Alternatively, a network management system 14 may be implemented using a cluster of workstations.

Figure 2:
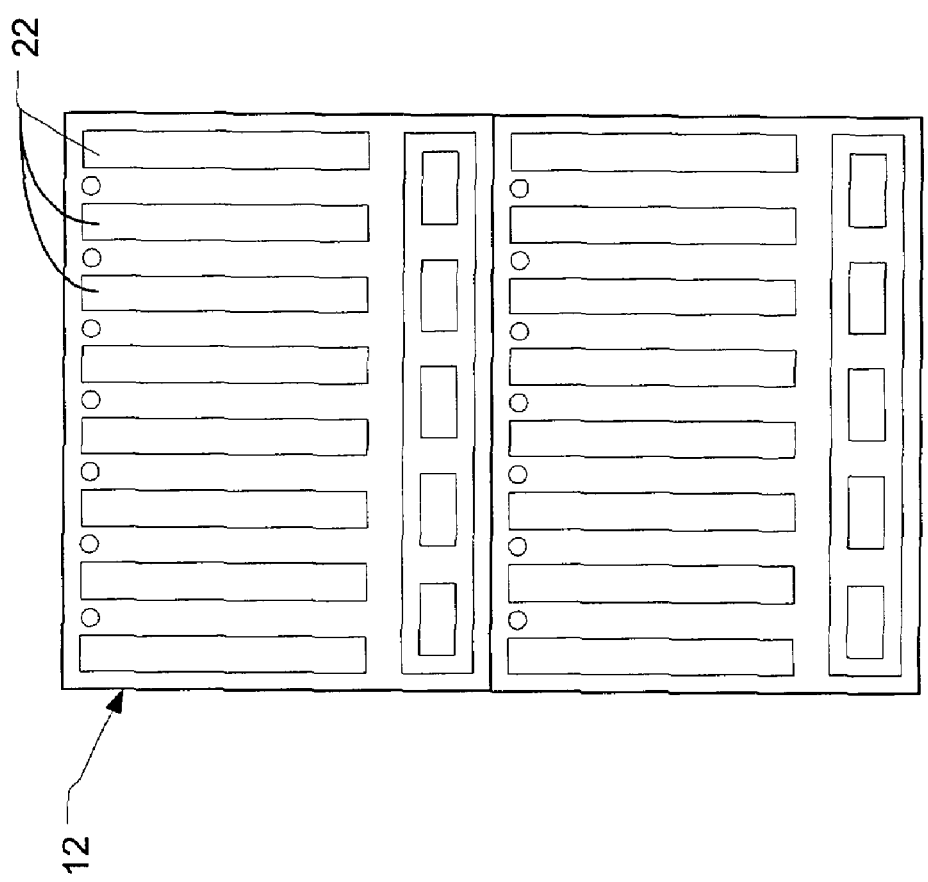
FIG. 2 is a block diagram of an optical network element.

FIG. 2 is a block diagram of an optical network element 12. As shown in FIG. 2, the optical network element 12 includes a number of hardware components 22 (also referred to as circuit packs). There are typically a plurality of hardware components 22 which may be arranged on shelves in the optical network element 12. In existing systems, there may be 70-80 different types of hardware components 22, with an optical network element 12 including hundreds of hardware components. Of course, each optical network element 12 may include different types of hardware components 22 in different numbers. Thus, the variations in hardware features that must be managed by a network management system 14 are significant.

The network management systems 14 include a display 15 for providing information concerning the optical communications network 10 to the user, for example, through a graphical user interface (GUI). The optical network elements 12 and the network management systems 14 communicate over communications link 16 as shown in FIG. 1. Communications link 16 may be a standalone network (e.g., an overlay IP network) or may be a channel (e.g., a service channel) of the optical communications network 10. The service channel is often used for communication between optical network elements 12 and further details may be found in U.S. Pat. Nos. 5,532, 864; 5,798,855 and 6,141,125. In a preferred embodiment, the communications link 16 is a private network so that the public does not have access to optical network elements 12. A number of communications protocols may be used between the network management systems 14 and the optical network elements 12 such as Transaction Language 1 (TL1).

A memory device 18 is used to store dynamically loadable feature applications 34 that may be uploaded to a network management system 14. As described in further detail herein, feature applications 34 provide support for certain hardware features. As used herein, hardware feature is intended to have a broad meaning including functional aspects provided by components, firmware embedded in components or software. Thus, a hardware feature may be updated by the release of new firmware or software executed by a component. An exemplary hardware feature enabled by software is span management functionality as described in U.S. Pat. No. 6,163, 392, assigned to CIENA Corporation.

Upon user request or autonomously, the network management system 14 is directed to monitor and/or configure an optical network element 12. If the network management system 14 detects a hardware feature in the optical network element 12 that is not supported by the software present on the network management system 14, the feature application 34 may be retrieved from memory device 18 and installed in the framework application 32. In this manner, the feature applications 34 are analogous to applets. Although memory device 18 is depicted as an isolated element, it is understood that the memory device 18 may be a separate device (e.g. an FTP server, HTTP server, etc.), memory in network management system 14, memory in optical network element 12, or a combination of the above. In addition, the memory device 18 may be accessible through multiple networks such a local network (e.g., LAN) and/or a global network (e.g., Internet).

Figure 3:
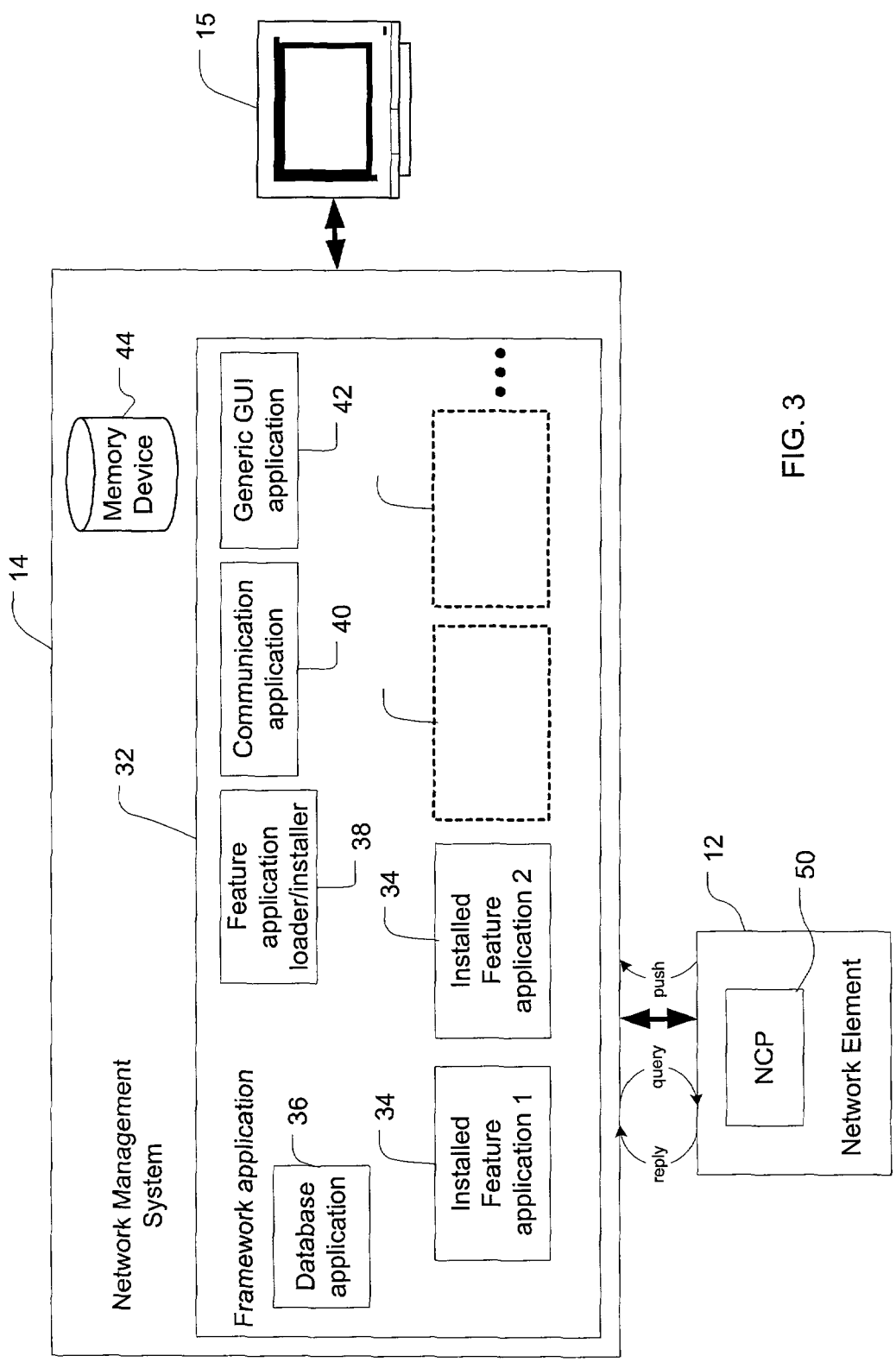
FIG. 3 is a block diagram illustrating exemplary software components executed by a network management system.

FIG. 3 is a block diagram illustrating exemplary software components executed by a network management system 14. The network management system 14 executes a framework application 32 and one or more feature applications 34. The framework application 32 is a stand-alone application that provides high-level functions. The framework application 32 includes a database application 36 that stores information concerning optical network elements 12 in communication with the network management system 14. This database application 36 may store information in memory device 44 local to network management system 14. For example, the database application 36 may store a list of hardware components 22 contained in an optical network element 12 in local memory 44. This allows the framework application 32 to access this information without having to poll the optical network element 12 and frees communication resources of both the network management system 14 and the optical network element 12.

A communication application 40 handles communication with the optical network elements 12. The communication application 40 is platform independent making it functional in a variety of network management system 14 implementations (e.g., personal computer, servers, workstations, etc.). The communication application 40 communicates with a network control processor (NCP) 50 in optical network element 12 to obtain information concerning hardware features provided by the optical network element 12. The communication may be performed in a variety of manners. The communication application may query the NCP 50 to identify hardware features present on the optical network element 12. The NCP 50 replies to this query as shown by the "query" and "reply" paths in FIG. 3. Alternatively, the NCP 50 may detect when a new hardware component 22 is installed in the optical network element 12. Upon detecting the new hardware component 22, the NCP 50 provides the identification of the hardware features to the communication application 40. This is depicted as the "push" path in FIG. 3.

A generic graphical user interface (GUI) application 42 generates a consistent GUI layout on display 15 for any optical network element 12. As described in further detail herein, the GUI includes generic portions provided by the generic GUI application 42 and feature-specific portions generated by framework applications 34. The generic GUI application 42 creates a consistent look and feel to the GUI and provides certain functions and information in a consistent manner. The framework applications 34 generate a feature-specific portion of the GUI specific to a hardware feature.

The optical network elements 12 vary in type and may include a large number of hardware components 22 (e.g., NCP, amplifiers, add-drop multiplexers, etc), each having multiple versions with diverse management requirements. Based on the hardware features present, the network management system 14 then obtains the appropriate feature application 34 to support these hardware features. Features include functional aspects of the hardware components 22 such as the ability to handle certain data rates (e.g., 2.5 Gbps or 10 Gbps channels) or the format of the transmission (e.g., FEC or non-FEC). For example, feature application 1 may be installed to support a hardware component 22 for SONET channels and feature application 2 may be installed to support another hardware component 22 for Gigabit Ethernet channels.

As used herein, the task of managing of the optical network element 12 is intended to have a broad meaning including functions such as monitoring and configuring the optical network element 12. The monitoring function may include receiving maintenance information, operation status, alarm status, etc. The configure function may include resetting the hardware, setting hardware defaults, configuring operational aspects of the hardware, etc. The framework application 32, along with any necessary feature applications 34, handles requests to monitor or configure an optical network element 12.

Figure 4:
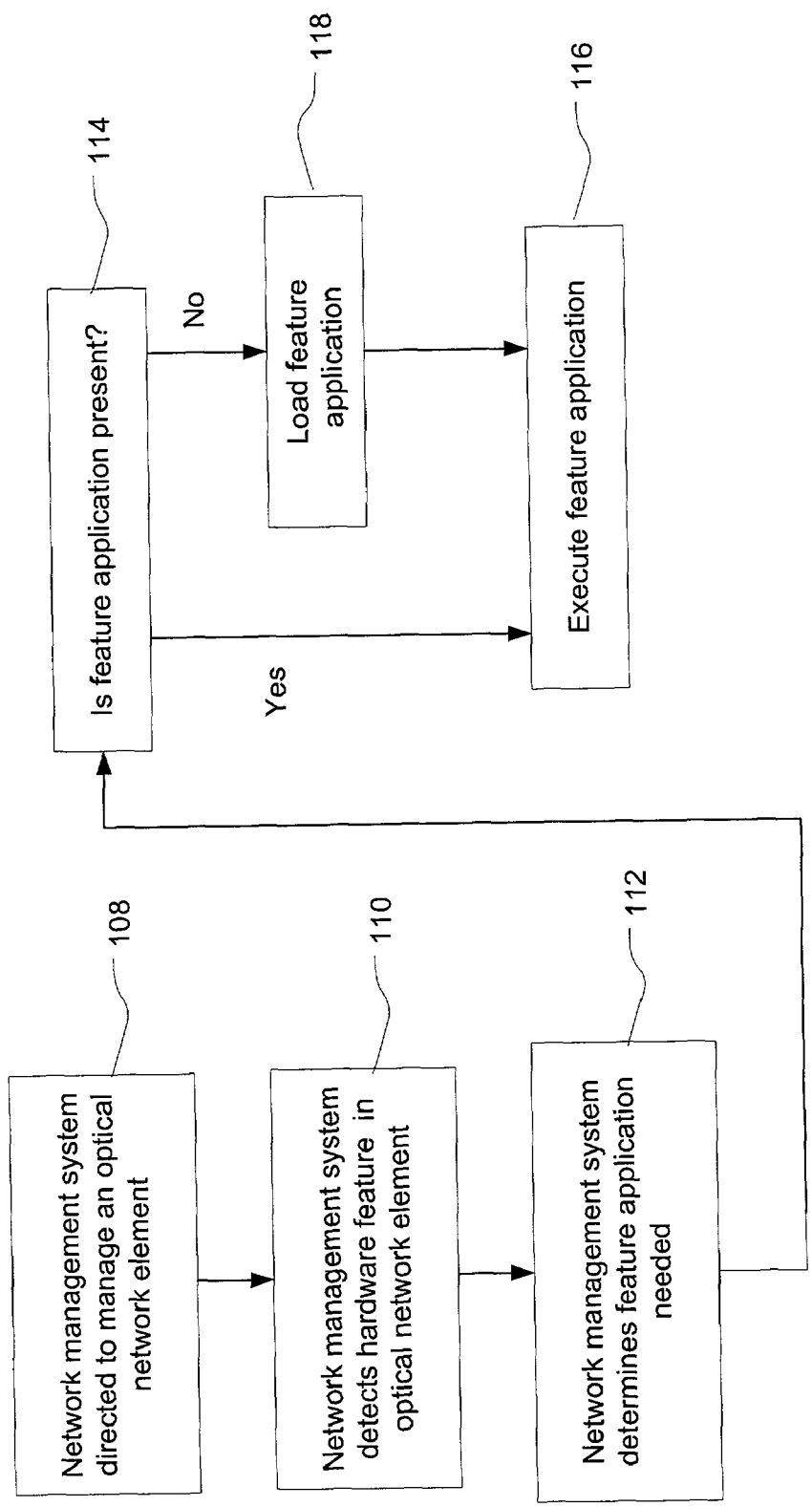
FIG. 4 is a flowchart of an exemplary process for obtaining a feature application.

FIG. 4 is a flowchart of processing performed by the network management system 14. The process begins at step 108 where the network management system 14 is directed to manage (e.g., monitor or configure) an optical network element 12. This request may come from a human user requesting, for example, status information on a hardware component 22 in the optical network element 12. Alternatively, the network management system 14 may periodically monitor optical network elements 12 by polling the optical network elements 12 in response to a computer program. Alternatively, the optical network element 12 may initiate communications with the network management system 14 in response to events such as a new hardware component 22 being installed in the optical network element 12 or a fault in the optical network element 22.

At step 110, the network management system 14 communicates with the NCP 50 to detect the hardware features present on the optical network element 12. Again, the framework application 32 communicates with the optical network element 12. One technique for detecting hardware features in optical network element 12 is for the NCP 50 to provide the revision level (also referred to as the version) of the hardware components 22 installed in the optical network element 12. The optical network element 12 typically includes a large number of hardware components 22 (also referred to as circuit packs) and the NCP 50 provides the revision level for one or more hardware components 22 to the network management system 14. The revision level for a hardware component 22 defines the hardware features provided by that hardware component 22. As described above, the network management system 14 may request the revision levels (query and reply) or the optical network element 12 may supply the revision levels autonomously (push). Memory device 18 may include a file indexing hardware features with revision levels.

Once the hardware features of the optical network element 12 are detected, the network management system 14, through framework application 32, determines the feature applications 34 needed to support these hardware features at step 112. The necessary feature applications 34 may be determined based on a translation table indexing feature applications 34 with hardware revision levels. The translation table may be stored in memory device 18 and updated as hardware components 22 are released.

Alternatively, the framework application 32 may receive a single revision level from the NCP 50 corresponding to all hardware features present in the optical network element 12. The framework application 32 then accesses memory device 18 and locates a directory having a name corresponding to the optical network element 12 revision level. The necessary feature applications 34 to support the hardware features for that optical network element 12 are stored in this directory.

Once the network management system 14 detects the hardware features in the optical network element 12, flow proceeds to step 114 where the framework application 32 determines if the needed feature applications 34 are already present on the network management system 14. The framework application 32 may compare file names stored on the network management system 14 to files stored in memory device 18. If the needed feature applications 34 are present, flow proceeds to step 116 where the feature application 34 is executed as illustrated in FIG. 3 as one of the feature applications 34. This feature application 34 provides functionality to interface with the hardware component 22 detected at step 110 to provide for configuring or monitoring of the hardware component 22.

If the needed feature application 34 is not found at step 114, flow proceeds to step 118 where the framework application 32 retrieves and installs the necessary feature application 34 from memory device 18. Again, this is depicted in FIG. 3 as one of the feature applications 34. It is understood that a plurality of hardware features may be detected by framework application 32 and a plurality of feature applications 34 retrieved from memory device 18. From step 118, the process arrives at step 116 where the feature application 34 is executed.

The framework application 32 and the feature applications 34 provide certain functions. In general, the framework application 32 provides high-level functions such as providing communications between the network management system 14 and the optical network elements 12 and controlling levels of access. In addition, the framework application 32 generates a consistent user interface through generic GUI application 42. The dynamically loaded feature applications 34 provide software support for monitoring and/or configuring specific hardware components 22 in optical network elements 12. Thus, as new hardware components 22 are released, a corresponding feature application 34 is stored in memory device 18. In this manner, the framework application 32 need not be updated upon release of each updated hardware component 22.

Figure 5:
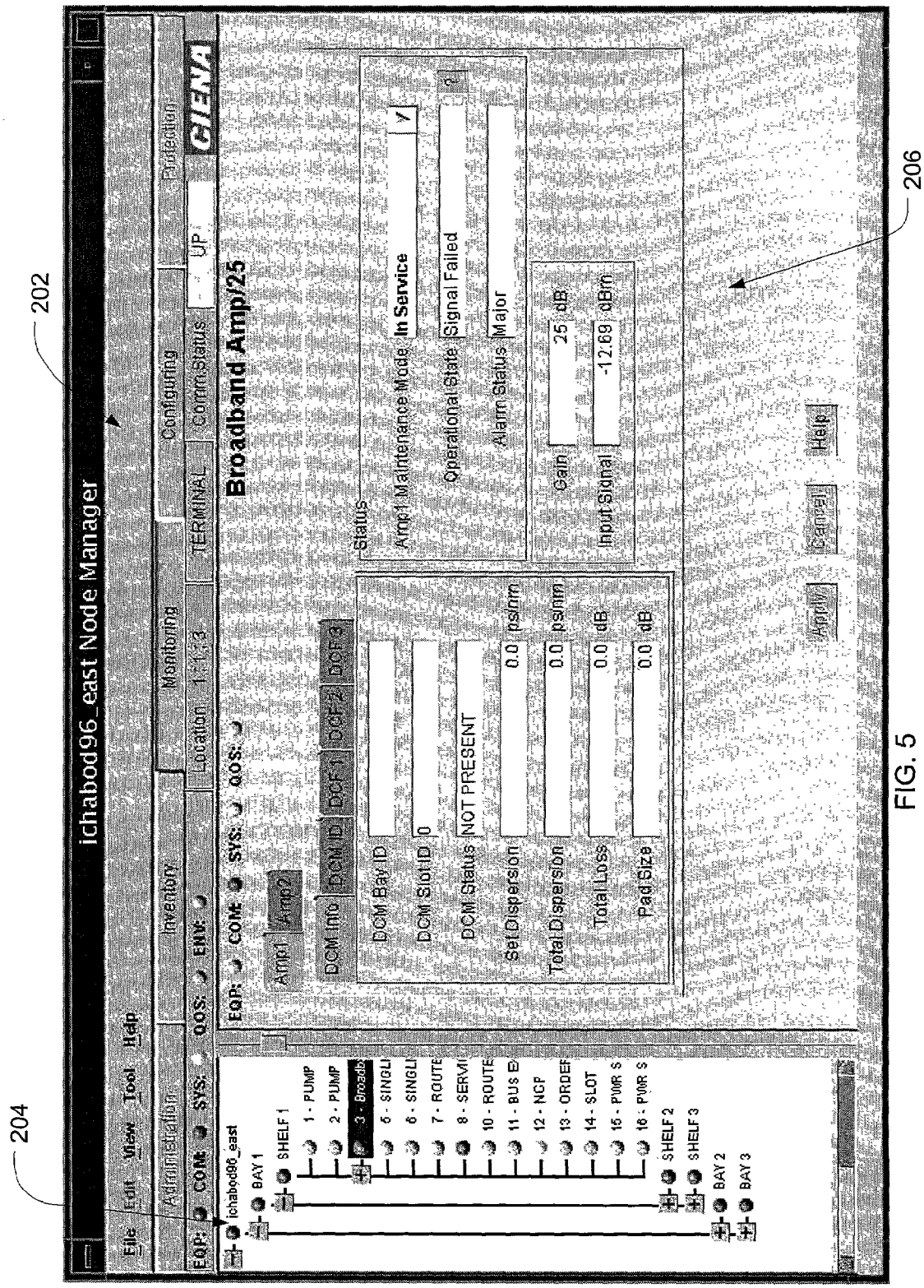
FIGS. 5-9 are exemplary display screens provided by a network management system.

FIGS. 5-9 depict exemplary user interfaces provided on display 15 of network management system 14. FIG. 5 illustrates an exemplary monitoring user interface for an amplifier. The user interface includes a toolbar 202 including drop down windows, tabs and buttons all corresponding to functions provided by the framework application 32. In addition, a hierarchical listing 204 of individual hardware components 22 detected by the framework application 34 is provided. The toolbar 202 and hierarchical listing 204 are generic portions of the GUI generated by the generic GUI application 42.

The hierarchical listing 204 of hardware components 22 uses a generic format to support any type of hardware component 22. The hierarchy is arranged based on the physical configuration of optical network elements 12. Optical network elements 12 include one or more bays, with each bay including one or more shelves, and each shelf including a number of slots for receiving hardware components 22. The hierarchical listing 204 follows this physical hierarchy to designate hardware components 22.

A feature-specific portion 206 is generated by the feature application 34. In the example shown in FIG. 5, the feature application 34 corresponding to the particular amplifier generates the user-fillable fields and informational fields in feature-specific portion 206. The feature application 34 may also generate graphical depiction of the hardware component 22 as described with reference to FIG. 9. Again, using the feature application 34 to provide information in the user interface eliminates the need to update the framework application 32 upon release of new hardware components 22.

Figure 6:
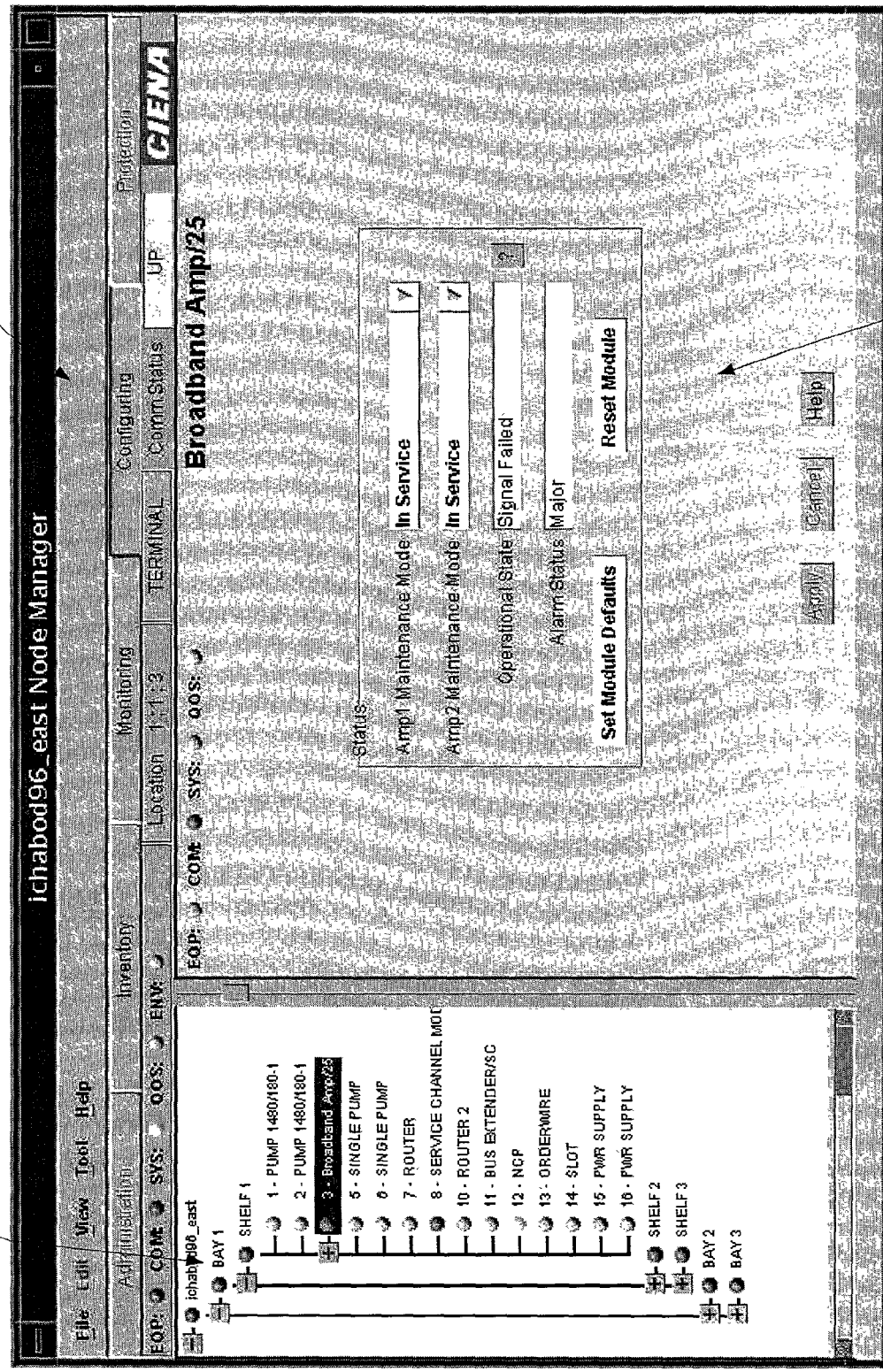

FIG. 6 depicts another exemplary user interface for configuring an amplifier in optical network element 12. Again, the user interface includes toolbar 202 and hierarchical listing 204 of hardware components 22 provided by framework application 32. The content for the feature-specific field 206 is generated by the generic GUI application 42. The feature-specific region 206 includes items such as user finable fields, information fields and graphical objects corresponding to the hardware component 22.

Figure 7:
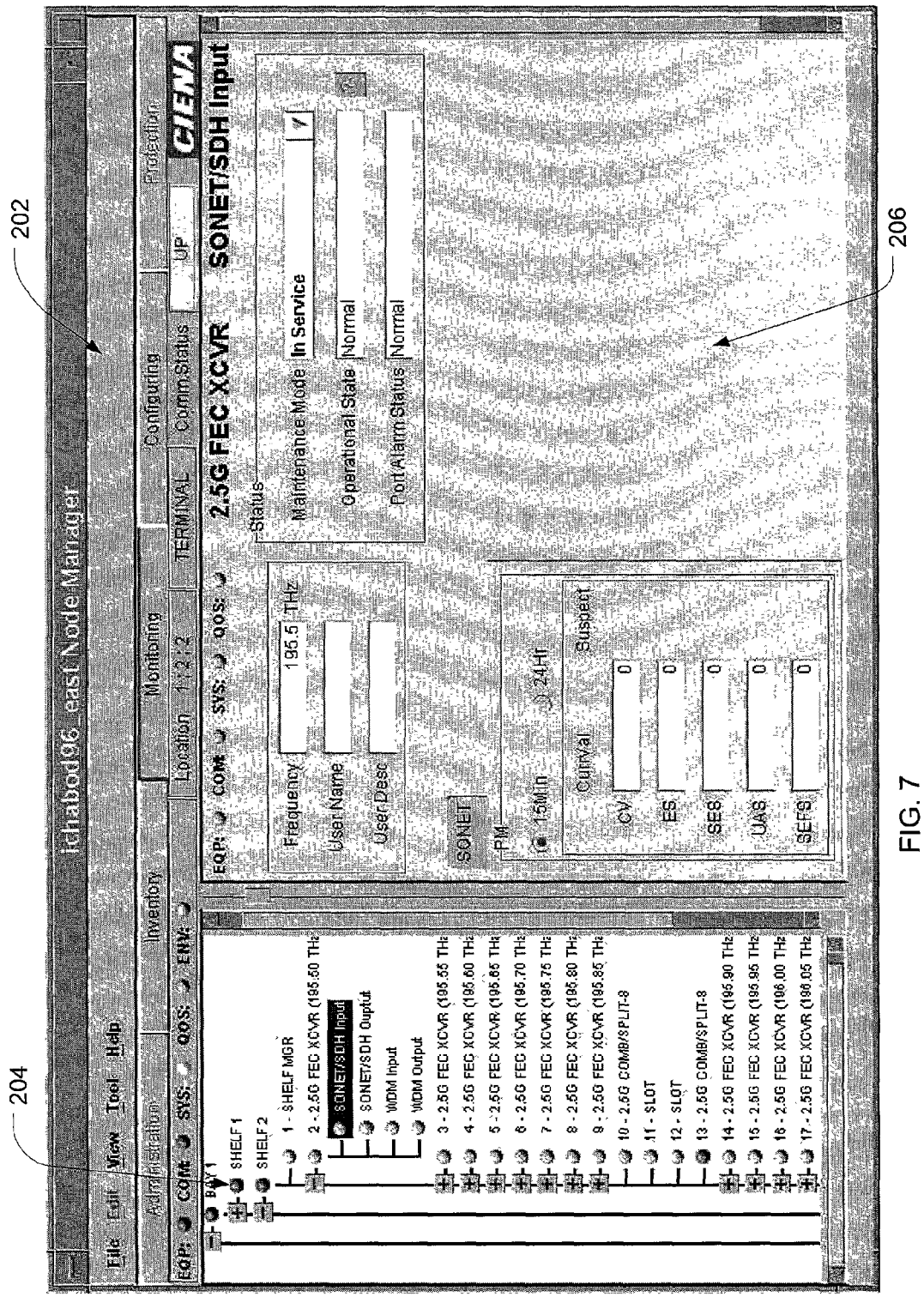
Figure 8:
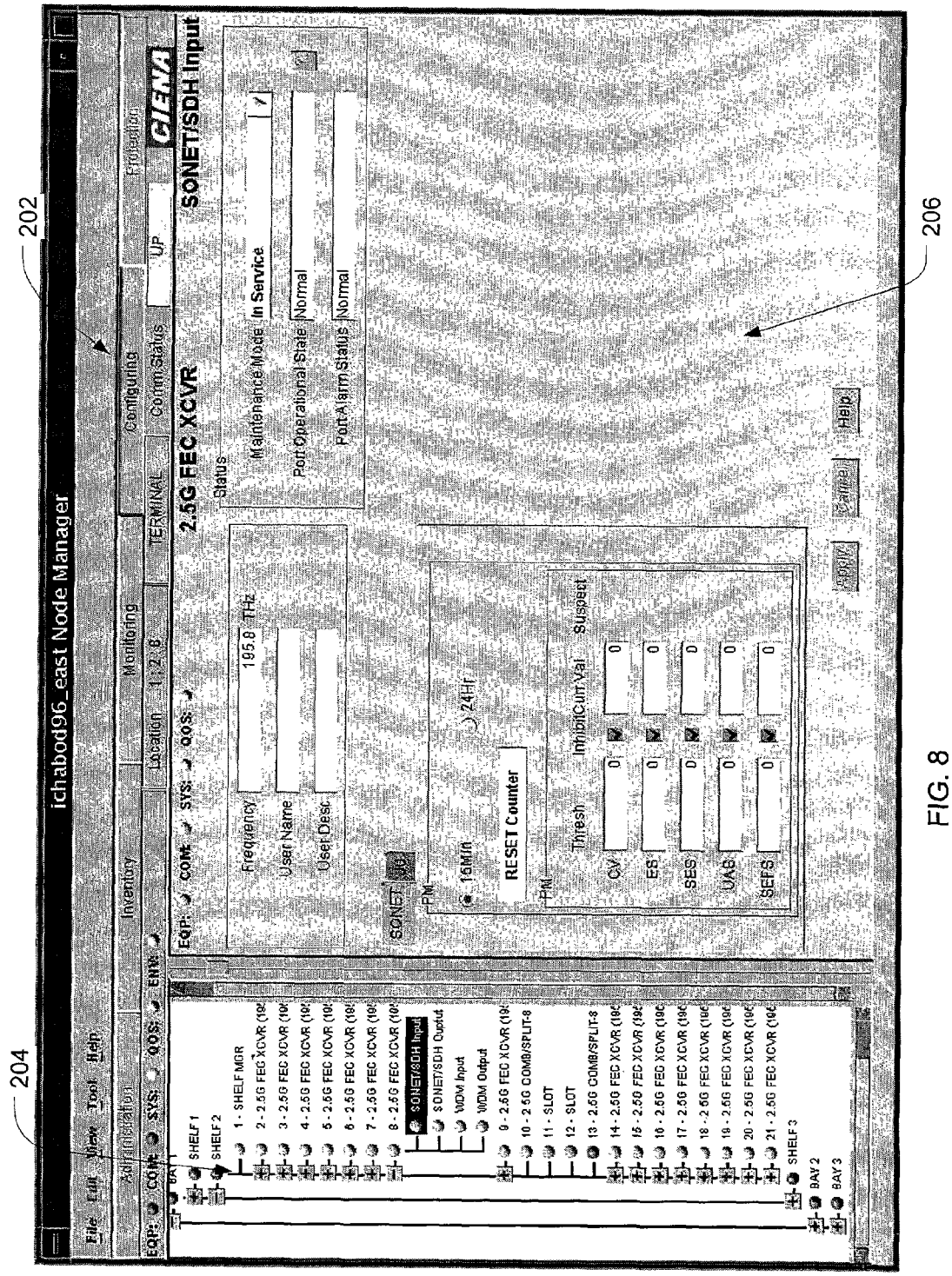

FIGS. 7 and 8 depict monitoring and configuring of a transceiver hardware component 22 in the optical network element 12. Again, the GUI includes generic portions 202 and 204 and feature-specific portion 206. The generic GUI application 42 generates generic portions 202 and 204. The framework application 34 generates the feature-specific portion 206.

Figure 9:
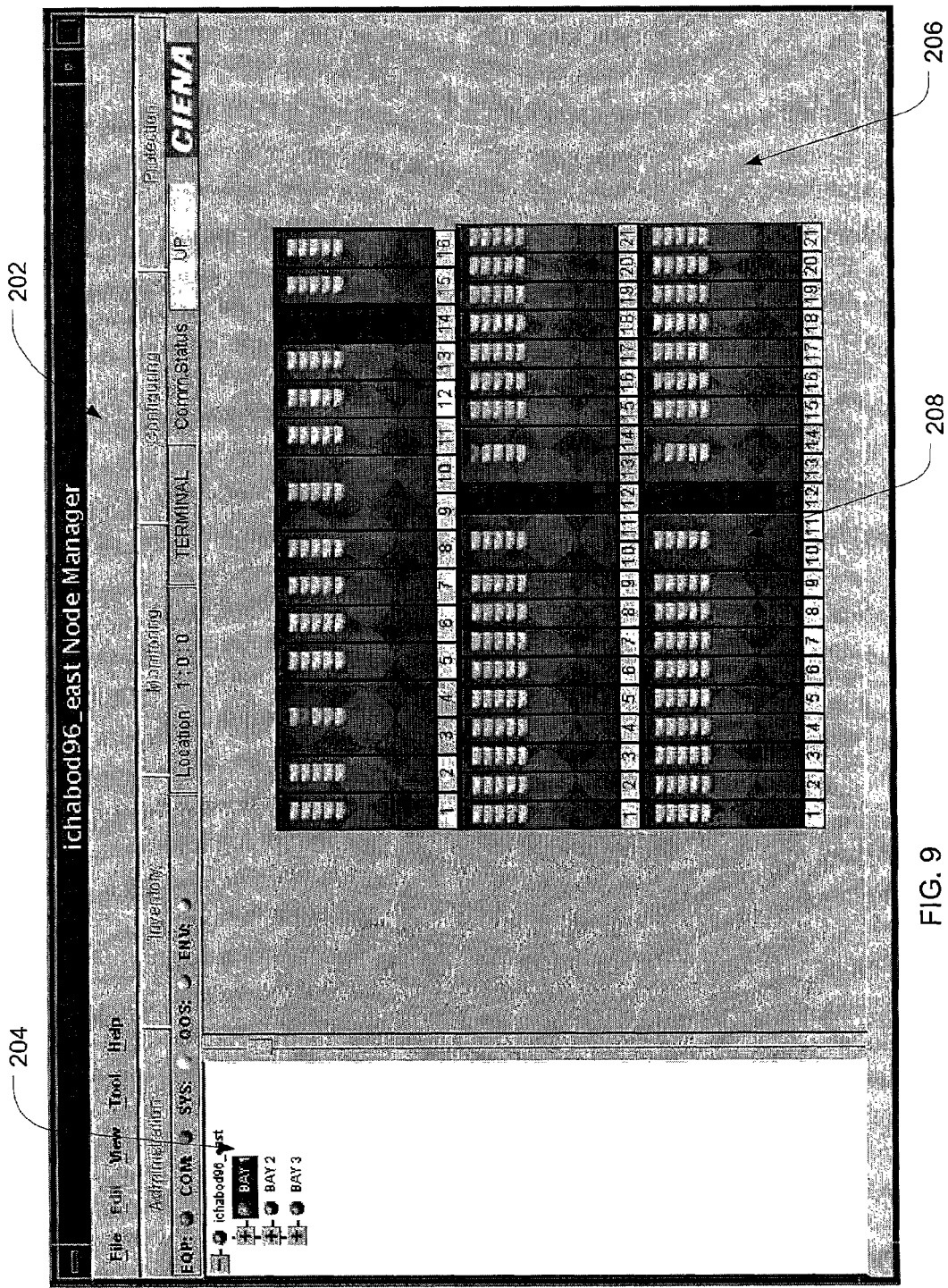

FIG. 9 depicts a GUI including a graphical depiction of the hardware components 22 in the optical network element 12. Again, the GUI includes generic portions 202 and 204 and feature-specific portion 206. The generic GUI application 42 generates generic portions 202 and 204. The framework application 34 generates the feature-specific portion 206. The feature application 34 also generates a graphical representation 208 of a hardware component 22. The feature application 34 associated with a new hardware component 22 generates the graphical depiction 208 so that a user has an accurate representation of the physical hardware component 22.

Using the above-described exemplary embodiments of the invention, the release of new optical network element hardware will be managed by releasing dynamically loaded feature applications for the new hardware. These feature applications only need to be updated on a single memory device accessible by the network management system. Once the feature applications are stored at the memory device, all network management systems have immediate access to the updated feature applications. The framework application of the network management system then automatically downloads the new feature application when needed to monitor or configure the hardware. This eliminates the need to release new, monolithic network management system software upon each hardware release. This also eliminates the need to coordinate the update of network management software across geographically dispersed network management systems.

Embodiments of the invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. An optical communications network comprising:
   a plurality of optical network elements;
   a plurality of network management systems, each executing a framework application;
   a communications link coupling at least one of said network management systems and at least one of said optical network elements; and
   a memory device accessible by said at least one network management system;
   wherein said at least one network management system communicating with said at least one optical network element to detect a hardware feature present at said at least one optical network element that is not currently supported by said at least one network management system, wherein said hardware feature comprises any of data rate, transmission format, transmission protocol, and span management, wherein said network management system comprises a user interface, the user interface comprising a generic portion generated by the framework application, a hierarchical listing of hardware components in the optical network, wherein the hierarchical listing is arranged based on a physical configuration of said optical network elements, wherein said optical network elements comprise one or more bay, wherein said one or more bay comprises one or more shelf, and wherein said one or more shelf comprises a plurality of hardware component slots, and a feature-specific portion generated by a feature application;
   wherein said at least one network management system determining the feature application supporting the hardware feature that is not supported by the framework application, wherein the determining of the feature application is responsive to a comparison of file names between files in the at least one of said network management systems and files in said memory device;
   wherein said at least one network management system loading the feature application from said memory device to the framework application if it is determined that the feature application is not already supported by the framework application, wherein the memory device is configured to store dynamically loadable feature applications for providing support for certain hardware features;
   wherein said at least one network management system executing the feature application at said at least one network management system to manage said at least one optical network element;
   wherein said at least one network management system through the execution of the feature application supports said hardware feature without requiring a new monolithic software upgrade of the at least one network management system, said feature application working coextensive with another feature application previously supported by said at least one network management system; and
   wherein said at least one network management system communicates with said at least one optical network element in response to installing a hardware component in said at least one optical network element.

2. The optical communications network of claim 1 wherein the feature application generates a graphical depiction in the feature-specific portion of a hardware component in said at least one optical network element.

3. The optical communications network of claim 1 wherein said at least one network management system receives a revision level for a hardware component in said at least one optical network element and determines the hardware feature based on the revision level for the hardware component.

4. The optical communications network of claim 1 wherein said at least one network management system receives a revision level for said at least one optical network element and determines the hardware feature based on the revision level for said at least one optical network element.

5. The optical communications network of claim 4 wherein said at least one network management system accesses a directory in said memory device, the directory having a name corresponding to the revision level for said at least one optical network element.

6. The optical communications network of claim 1 wherein said at least one network management system communicates with said at least one optical network element in response to a request from an operator.

7. The optical communications network of claim 1 wherein said at least one network management system communicates with said at least one optical network element in response to the framework application initiating communication with the optical network element.

8. The optical communications network of claim 1 wherein said memory device is separate from said at least one network management system.

9. A method for managing optical network elements in an optical communications system including network management systems each executing a framework application and a plurality of optical network elements each having diverse hardware components, the method comprising:
   managing the optical network elements in the optical communications system with the network management systems;
   installing a hardware component in at least one optical network element, said hardware component comprising a hardware feature not currently supported by at least one network management system;
   initiating communication between said at least one network management system and the at least one optical network element, the communication implemented by the framework application, wherein said initiating is performed in response to installing the hardware component in the at least one optical network element;

detecting said hardware feature present at the at least one optical network element, wherein said hardware feature comprises any of data rate, transmission format, transmission protocol, and span management;

determining a feature application supporting the hardware feature that is not already supported by the framework application, wherein the determination of the feature application is responsive to a comparison of file names between files in the at least one network management system and files in a memory device;

loading the feature application from the memory device to the framework application if it is determined that the feature application is not already supported by the framework application, wherein the memory device is configured to store dynamically loadable feature applications for providing support for certain hardware features;

generating a user interface, the user interface comprising a generic portion generated by the framework application, a hierarchical listing of hardware components in the optical network wherein the hierarchical listing is arranged based on a physical configuration of said optical network elements;

executing the framework application having the feature application at the at least one network management system to manage the at least one optical network element, wherein said at least one network management system through the execution of the feature application supports said hardware feature without requiring a new monolithic software upgrade of the at least one network management system, said feature application working coextensive with another feature application previously supported by said at least one network management system; and managing said at least one optical network element with said at least one network management system.

10. The method of claim 9 wherein the feature application generates a graphical depiction in the feature-specific portion of a hardware component in the at least one optical network element.

11. The method of claim 9 wherein said detecting the hardware feature present at the at least one optical network element includes receiving a revision level for a hardware component in the at least one optical network element and determining the hardware feature based on the revision level for the hardware component.

12. The method of claim 9 wherein said detecting the hardware feature present at the at least one optical network element includes receiving a revision level for the at least one optical network element and determining the hardware feature based on the revision level for the at least one optical network element.

13. The method of claim 12 wherein said determining the feature application supporting the hardware feature includes accessing a directory in the memory device, the directory having a name corresponding to the revision level for the at least one optical network element.

14. The method of claim 9 wherein said initiating is performed in response to a request from an operator.

15. The method of claim 9 wherein said initiating is performed in response to the framework application.

16. The method of claim 9 wherein the memory device is separate from the at least one network management system.

* * * * *